US012208730B1

(12) United States Patent
Schumacher et al.

(10) Patent No.: US 12,208,730 B1
(45) Date of Patent: Jan. 28, 2025

(54) APPARATUS AND A METHOD FOR ANTI-COLLISION MONITORING WITHIN A SERVICE ENVIRONMENT

(71) Applicant: Quick Quack Car Wash Holdings, LLC, Roseville, CA (US)

(72) Inventors: Josh David Schumacher, Sacramento, CA (US); Joseph Allen Steele, III, Plumas Lake, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/635,632

(22) Filed: Apr. 15, 2024

(51) Int. Cl.
*B60Q 5/00* (2006.01)
*B60S 3/00* (2006.01)
*B60S 3/04* (2006.01)
*G01S 17/931* (2020.01)

(52) U.S. Cl.
CPC .............. *B60Q 5/006* (2013.01); *B60S 3/004* (2013.01); *B60S 3/04* (2013.01); *G01S 17/931* (2020.01)

(58) Field of Classification Search
CPC . B60Q 5/006; B60S 3/004; B60S 3/04; G01S 17/931
USPC ........................................................ 701/301
See application file for complete search history.

(56) References Cited

U.S. PATENT DOCUMENTS

| | | | | |
|---|---|---|---|---|
| 9,646,428 B1* | 5/2017 | Konrardy | ........... | G06Q 10/0635 |
| 10,682,989 B2* | 6/2020 | Blackstock | .......... | G05D 7/0623 |
| 11,127,283 B2 | 9/2021 | Ness et al. | | |
| 11,531,088 B2* | 12/2022 | Popov | .................... | G01S 13/865 |
| 11,908,182 B1* | 2/2024 | Nichols | .................... | G01S 17/89 |
| 2016/0311450 A1* | 10/2016 | Roberts | ................... | B61L 17/00 |
| 2017/0032402 A1* | 2/2017 | Patsiokas | ........... | G06Q 30/0207 |
| 2018/0025624 A1* | 1/2018 | Ness | ........................ | G06T 7/251 714/47.2 |
| 2019/0061705 A1* | 2/2019 | Blackstock | ............... | B60S 3/04 |
| 2021/0089040 A1* | 3/2021 | Ebrahimi Afrouzi | ........................ | A47L 9/2873 |
| 2021/0171144 A1* | 6/2021 | Champoux | ........... | B62K 3/002 |
| 2022/0066456 A1* | 3/2022 | Ebrahimi Afrouzi | ........................ | G06F 3/04883 |
| 2022/0122363 A1* | 4/2022 | Liong | .................... | G06V 20/58 |
| 2022/0187841 A1* | 6/2022 | Ebrahimi Afrouzi | ........................ | G05D 1/0274 |

(Continued)

FOREIGN PATENT DOCUMENTS

| | | | | |
|---|---|---|---|---|
| DE | 102018101487 A1 * | 7/2018 | .............. | B60Q 1/34 |
| KR | 20170142620 A | 12/2017 | | |

*Primary Examiner* — Atul Trivedi
(74) *Attorney, Agent, or Firm* — Caldwell Intellectual Property Law

(57) ABSTRACT

An apparatus for anti-collision monitoring within a service environment is disclosed. The apparatus includes at least processor and a memory communicatively connected to the processor. The memory instructs the processor to identify a plurality of vehicle data associated with each vehicle of two or more vehicles from a first set of sensors. The memory instructs the processor to calculate a spacing metric for each vehicle as a function of the plurality of vehicle data. The memory instructs the processor to generate a collision score as a function of the spacing metric and the plurality of vehicle data. The memory instructs the processor to generate a movement metric as a function of the collision score and the spacing metric. The apparatus includes a conveyor system configured to move each vehicle of the two or more vehicles using the one or more attachment mechanisms as a function of the movement metric.

20 Claims, 10 Drawing Sheets

(56) References Cited

U.S. PATENT DOCUMENTS

| | | | |
|---|---|---|---|
| 2022/0413502 A1* | 12/2022 | Keski-Valkama | G05D 1/0214 |
| 2023/0138163 A1* | 5/2023 | Sivanesan | G08G 1/162 |
| | | | 701/301 |
| 2023/0339502 A1* | 10/2023 | Chi-Johnston | G06N 20/00 |
| 2024/0110799 A1* | 4/2024 | Beaurepaire | G01S 17/89 |

* cited by examiner

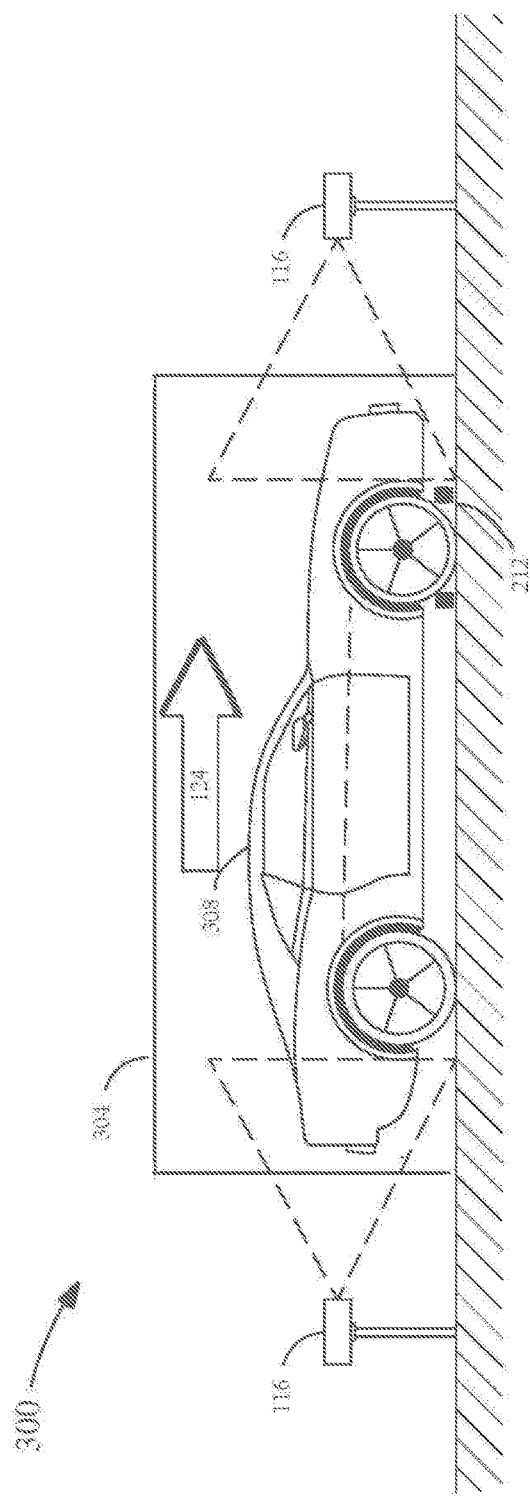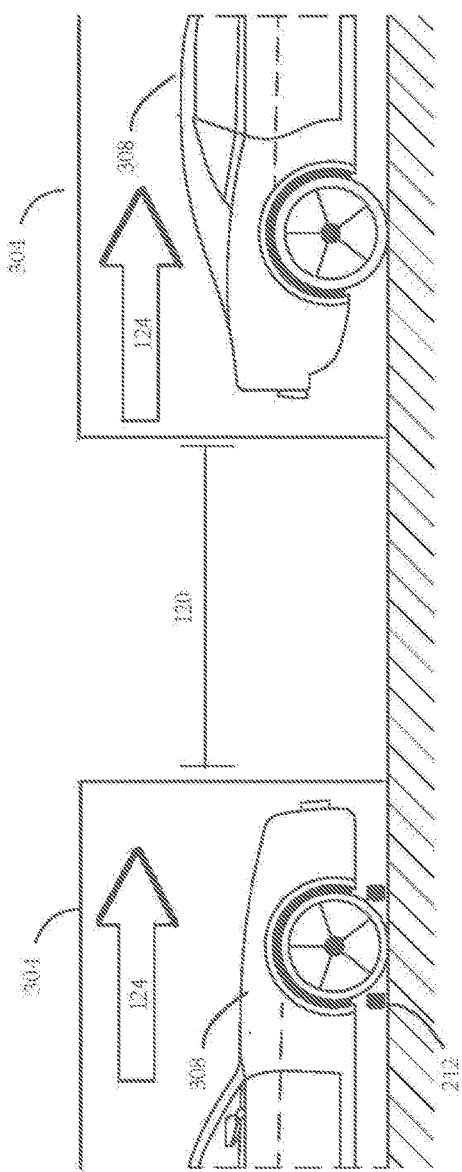
FIG. 3A
FIG. 3B

APPARATUS AND A METHOD FOR ANTI-COLLISION MONITORING WITHIN A SERVICE ENVIRONMENT

FIELD OF THE INVENTION

The present invention generally relates to the field of anti-collision monitoring. In particular, the present invention is directed to an apparatus and a method for anti-collision monitoring within a service environment.

BACKGROUND

In the realm of service environments, particularly those involving automated systems such as manufacturing assembly lines, automated car washes, or robotic warehousing, the risk of collision between mechanical components or between machinery and human operators presents a significant challenge. These environments typically feature a complex interplay of moving parts, where precision and safety are paramount. Traditional safety mechanisms often rely on basic sensor input or are reactive in nature, merely responding to imminent threats of collision without predictive capabilities.

SUMMARY OF THE DISCLOSURE

In an aspect, an apparatus for the anti-collision monitoring within a service environment is disclosed. The memory instructs the processor to identify a plurality of vehicle data associated with each vehicle of two or more vehicles from a first set of sensors. The memory instructs the processor to calculate a spacing metric for each vehicle as a function of the plurality of vehicle data. The memory instructs the processor to generate a collision score as a function of the spacing metric and the plurality of vehicle data. The memory instructs the processor to generate a movement metric as a function of the collision score and the spacing metric. The apparatus includes a conveyor system located within a service environment configured to be mechanically connected to each vehicle of the two or more vehicles using one or more attachment mechanisms, wherein the conveyor system is configured to move each vehicle of the two or more vehicles using the one or more attachment mechanisms as a function of the movement metric.

In another aspect, a method for the anti-collision monitoring within a service environment is disclosed. The method includes identifying, using at least a processor communicatively connected to a conveyor system, a plurality of vehicle data associated with each vehicle of two or more vehicles from a first set of sensors. The method includes calculating, using the at least a processor, a spacing metric for each vehicle as a function of the plurality of vehicle data. The method includes generating, using the at least a processor, a collision score as a function of the spacing metric and the plurality of vehicle data. The method includes generating, using the at least a processor, a movement metric as a function of the collision score and the spacing metric. The method includes moving, using the conveyor system comprising one or more attachment mechanisms, each vehicle of the two or more vehicles as a function of the movement metric, wherein the conveyor system is located within a service environment configured.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A-B is an illustration of an exemplary embodiment of three-dimensional rendering within a service area;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the anti-collision monitoring within a service environment is disclosed. The memory instructs the processor to identify a plurality of vehicle data associated with each vehicle of two or more vehicles from a first set of sensors. The memory instructs the processor to calculate a spacing metric for each vehicle as a function of the plurality of vehicle data. The memory instructs the processor to generate a collision score as a function of the spacing metric and the plurality of vehicle data. The memory instructs the processor to generate a movement metric as a function of the collision score and the spacing metric. The apparatus includes a conveyor system located within a service environment configured to be mechanically connected to each vehicle of the two or more vehicles using one or more attachment mechanisms, wherein the conveyor system is configured to move each vehicle of the two or more vehicles using the one or more attachment mechanisms as a function of the movement metric. Exemplary embodiments illustrating aspects of the present disclosure are described below in the context of several specific examples.

Figure 1:
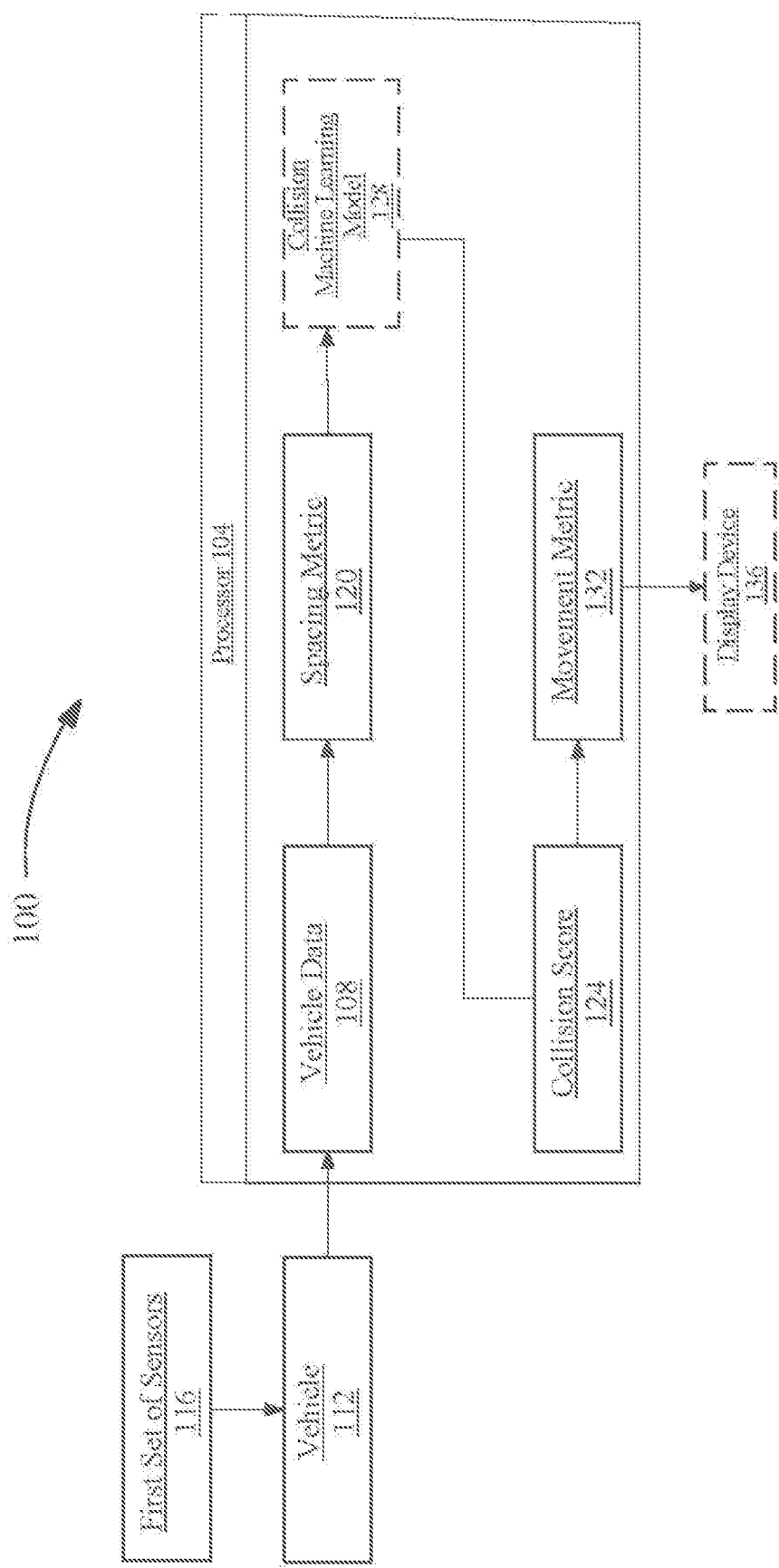
FIG. 1 is a block diagram of an exemplary embodiment of an apparatus for anti-collision monitoring within a service environment.

Referring now to FIG. 1, an exemplary embodiment of an apparatus 100 for anti-collision monitoring within a service environment is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to identify a plurality of vehicle data 108 associated with each vehicle of two or more vehicles 112. As used in the current disclosure, "vehicle data" is information associated with each vehicle within a service environment. As used in the current disclosure, a "vehicle" is a mobile machine that transports people, goods, or both. It operates on a variety of surfaces, including roads, rail, water, air, and, in some cases, off-road environments. Vehicles 112 are primarily designed for transportation purposes, and they come in numerous types and sizes, each suited for different needs and uses. Vehicles 112 may include cars, trucks, boats, motorcycles, SUVs, industrial equipment, and the like. Vehicle data 108 may include information about the vehicle location, vehicle size, weight, make, model, and the like. Vehicle data 108 may include information associated with a vehicle's physical location. Specifically, this may refer to the vehicle's location within a service environment or in relation to a conveyor system, mentioned in greater detail below. Vehicle data 108 may include information regarding the dimensions of the vehicle, including length, width, and height. Vehicle data 108 may include information related to the weight of the vehicle. This may be important for load planning, compliance with weight restrictions within the service environment and vehicle handling characteristics. Vehicle data 108 may include information related to the make and model of the vehicle. The make may indicate the company that produced the vehicle (e.g., Ford, Toyota, Tesla). The model of the vehicle refers to specific model name or designation given by the manufacturer. This may help in identifying the specific type of vehicle within a brand's lineup (e.g., Ford Mustang, Toyota Camry). In some cases, vehicle data 108 may include the year that the vehicle was made.

With continued reference to FIG. 1, vehicle data 108 may include dimension data. As used in the current disclosure, "dimension data" refers to various measurable attributes that define the physical characteristics of the vehicle, such as length, width, height, clearance, or the like. In an embodiment, and as a non-limiting example, dimension data may include a total length of the vehicle from the frontmost to the rear-most point. The first set of sensors 116 may be configured to identify any accessories attached to the vehicle and their associated dimension. This identification may be incorporated into the dimension data of the vehicle. Examples of accessories may include luggage racks, bump guards, bike racks, spare tires, trailer hitches, trailers, trailer hitch extensions, boat racks, motorhome extensions, extended cargo beds, rear spoilers, and the like. Dimension data may include the height of the vehicle. The height of the vehicle may be the vertical distance from the lowest to the highest point of the vehicle, which may be measured, without limitation, with standard tires and an unladen vehicle.

With continued reference to FIG. 1, vehicle data 108 may include movement data. As used in the current disclosure, "movement data" refers to information related to how a vehicle navigates and operates in a specific area. This data is crucial for optimizing traffic flow, enhancing safety, and improving service efficiency. Movement data may include geospatial information related to the vehicles. This may include information related to where the vehicle is located within the service area or on conveyor system. Movement data may be generated using GPS trackers or other location-tracking technologies to generate real-time maps of vehicle movement within the service area. In some embodiments, movement data may be paired with dimension data to identify exactly how vehicle is moving in relation the service area. Movement data may include information related to the speed of the vehicle at different points within the service area. Movement data may include information related to when and where vehicles stop and for how long within a specific area. Movement data may include information related to the number of vehicles within different parts of the service area at various times.

With continued reference to FIG. 1, processor 104 may be configured to receive the vehicle data 108 from a first set of sensors 116. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, movement, distance, speed, dimensions, and the like, into a sensed signal such as a voltage with respect to a reference. Sensors may detect a plurality of vehicle data 108 and other associated images. In one or more embodiments, and without limitation, sensor may include a plurality of sensors. In one or more embodiments, and without limitation, sensor may include an optical or image sensor such as a camera, a CMOS detector, a CCD detector, a video camera, a photodiode, a photovoltaic cell, a photoconductive device, a thermal and/or infrared camera, one or more temperature sensors, hydrometers, infrared sensors, photoelectric sensors, motion sensors, pressure sensors, sensors, imaging devices, moisture sensors, imaging sensors, force sensors, Hall sensors, and the like. In an embodiment, a sensor may include one or more inductive loop sensors. These sensors may include wires embedded in the road surface at the entry point and/or exit point of a service area. When a vehicle passes over or stops above the loop, the metal in the vehicle alters the magnetic field, which the sensor detects. Sensor may be a contact or a non-contact sensor. In an embodiment, a sensor may include an ultrasonic sensor. An ultrasonic sensor may use sound waves to detect vehicles. When a vehicle passes, it interrupts the sound waves, and the change in echo pattern is detected. In an additional embodiment, a sensor, may include optical sensors. As optical sensor may employ cameras or optical beams are used to visually or via light beams detect the presence and movement of vehicles. Signals may include electrical, electromagnetic, visual, audio, radio waves, or another undisclosed signal type alone or in combination.

Still referring to FIG. 1, a first set of sensors 116 may include a motion sensor. A "motion sensor," for the purposes of this disclosure, refers to a device or component configured to detect physical movement of an object or grouping of objects (i.e., Vehicle 112.) One of ordinary skill in the art would appreciate, after reviewing the entirety of this disclosure, that motion may include a plurality of types including but not limited to: spinning, rotating, oscillating, gyrating, jumping, sliding, reciprocating, driving, or the like. A motion sensor may be configured to identify the speed and distance associated with a moving object. Sensors may include torque sensor, gyroscope, accelerometer, torque sensor, magnetometer, inertial measurement unit (IMU), pressure sensor, force sensor, proximity sensor, displacement sensor, vibration sensor, among others.

With continued reference to FIG. 1, motion sensor may include a LIDAR (Light Detection and Ranging) sensor. As used in the current disclosure, a "LIDAR sensor" is a sophisticated tool used for measuring distances and mapping environments. In some cases, a LIDAR sensor can be used in detecting and gathering vehicle data 108. In an embodiment, a LIDAR sensor can be used to capture various dimensional data of a vehicle, such as height, width, length, and clearance. This may be done by emitting laser beams that bounce off the vehicle and return to the LIDAR sensor. The time taken for the light to return may be used to calculate distances very precisely. By scanning the vehicle from different angles, LIDAR sensor may create a detailed 3D representation. This representation may include precise measurements of the vehicle's overall dimensions. This may be used for collision avoidance, traffic flow analysis, and automated vehicle navigation. In an embodiment, by tracking the change in position of a vehicle over time, LIDAR can accurately measure its speed. This feature is useful in traffic monitoring and law enforcement for speed limit enforcement. In an embodiment, the detailed 3D images produced by LIDAR may allow for the differentiation between various types of vehicles (e.g., cars, trucks, motorcycles) based on size and shape. In some cases, LIDAR can be used to monitor and analyze traffic patterns within a service environment, vehicle density, and flow rates on roads and highways, aiding in traffic management and infrastructure planning. In some cases, LIDAR sensors may be used to create a detailed map of the service environment or vehicle's surroundings, including other vehicles, road boundaries, pedestrians, and obstacles. In some embodiments, LIDAR may work in conjunction with other sensors like cameras, radar, and GPS to provide a comprehensive understanding of the vehicle's environment, enhancing accuracy and reliability.

With continued reference to FIG. 1, first set of sensors 116 may include a sensor suite which may include a plurality of sensors that may detect similar or unique phenomena. For example, in a non-limiting embodiment, a sensor suite may include a plurality of voltmeters or a mixture of voltmeters and thermocouples. Apparatus 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, apparatus 100 may include a second set of sensors comprising one or more audio sensors. As used in the current disclosure, an "audio sensor" is a device designed to detect and measure sound. An audio sensor may include a microphone. This microphone may convert sound waves into electrical signals. The most common types are dynamic microphones, condenser microphones, and piezoelectric microphones, each with different methods of converting sound to an electrical signal. The sensor may be tuned to detect frequencies typical of vehicle collisions, such as metal-on-metal, breaking glass, and tire screeches. To ensure accuracy, the system may be equipped with noise cancellation technologies to filter out irrelevant background noises like wind, rain, or non-collision-related sounds. An audio sensor may be designed for use in an automated carwash to detect possible vehicle collisions. This sensor may be integrated into the car wash's control system. The audio sensor may be strategically positioned to cover the entire service area 200. It may be equipped with advanced acoustic recognition technology capable of distinguishing between the routine noises of the carwash equipment (like water jets, brushes, and air dryers) and the distinct, anomalous sounds generated by a vehicle collision, such as the crunch of metal or the shattering of glass. An audio sensor may operate by continuously monitoring ambient sounds, employing algorithms to analyze the audio data in real time.

With continued reference to FIG. 1, an audio sensor may be configured to generate an audible collision indicator. As used in the current disclosure, a "collision indicator" is an alert that denotes a potential vehicle collision. This system may rely on the audio sensor's ability to accurately identify collision-specific sounds amidst the background noise of the carwash environment. In an embodiment, when the audio sensor detects a sound pattern indicative of a collision, such as the crunching of metal or the cracking of plastic, it triggers the collision indicator. This indicator can manifest in several forms, including visual signals like flashing lights, auditory alarms such as sirens, or even a digital alert transmitted to the control system or the carwash operators. When the sensor detects a sound pattern that matches its programmed criteria for a collision, it may promptly trigger an alert. This alert can be configured to initiate various responses, such as halting the carwash operation, activating visual or auditory alarms, or notifying the carwash personnel for immediate intervention. The design of the collision indicator may be tailored to ensure immediate attention and action. In a busy carwash environment, where noise levels can be high and distractions plentiful, the indicator may be calibrated to stand out distinctly from the regular operational sounds and sights. For instance, the visual alarm might use bright, flashing lights in a color that contrasts with the surroundings, while the auditory alarm could emit a unique tone or pattern that differs from other routine alerts. Additionally, the digital alert sent to the control system could simultaneously halt the carwash operations to prevent further damage and dispatch a notification to the staff for rapid response. This multi-faceted approach ensures that any potential collision is swiftly and effectively addressed, minimizing damage, and maintaining safety standards.

With continued reference to FIG. 1, processor 104 is configured to calculate a spacing metric 120 for each vehicle 112 as a function of the plurality of vehicle data 108. As used in the current disclosure, a "spacing metric" is a measurement that determines the appropriate or required distance between two or more vehicles. A spacing metric 120 may include the spacing between the rear bumper of a first vehicle and the front bumper of a second vehicle. A spacing metric 120 may be calculated based each vehicle's location on the conveyor system. Specifically, a spacing metric 120 may be generated based on each attachment mechanism's location on the conveyor system. In an embodiment, each attachment mechanism may be attached to the wheels or the axel of the vehicle. Processor 104 may identify the distance from the attachment point of the attachment mechanism to the front and rear bumper of the vehicle as a function of the dimension data. This may be done in order to identify the ideal and safest spacing between the rear bumper of the first vehicle and the front bumper of the second vehicle. These calculations may be used to identify the ideal spacing between each attachment mechanism in order to prevent accidents. The spacing metric 120 may be an important parameter designed to optimize the service process while ensuring safety and preventing vehicle collisions. In an embodiment, calculating a spacing metric 120 may be especially important when a vehicle is in the process of attaching and detaching from the conveyor system. This may result in specialized spacing metrics 120 generated for each scenario. In a non-limiting example, a spacing metric 120 may be determined from the point a vehicle was detached from the conveyor system till the next time a vehicle can be detached from the conveyor system. A spacing metric may be defined using two primary methods: time intervals or conveyor travel distance. This measurement can be expressed in various units, such as meters, feet, seconds (in the case of time-based spacing), or any other relevant unit, depending on the context.

With continued reference to FIG. 1, the spacing metric 120 may define the spacing between two or more vehicles as a specific time gap. The time gap may be determined between the rear bumper of the first vehicle and the front bumper of the second vehicle. Alternatively, the time gap may be determined between the rear axle of the first vehicle and the front axle of the second vehicle. The conveyor system is programmed to maintain this time gap consistently. For instance, a car wash may set a time interval of between 10-60 seconds between each vehicle. Using a specific time gap may ensure that each vehicle has sufficient time to be processed through the service environment. Processor 104 may adapt a time-based spacing metric to variations in the service process, such as different cleaning requirements for different vehicles, by maintaining the same temporal distance regardless of the physical length of the vehicles. This may also be varied according to a given vehicles dimension data or movement data.

With continued reference to FIG. 1, spacing metric 120 may define the spacing between two or more vehicles as a conveyor travel distance. When the spacing metric 120 is defined by travel distance the spacing between vehicles may be defined by a set physical distance between vehicles on the conveyor. Distance-based spacing may be beneficial for maintaining a uniform physical gap, which is crucial in avoiding collisions and ensuring that each vehicle has ample space for service operations like wheel cleaning or side-brush movements. The distance may be determined by the distance the rear bumper of the first vehicle and the front bumper of the second vehicle. Alternatively, the distance may be determined between the rear axle of the first vehicle and the front axle of the second vehicle. In a non-limiting example, the system might ensure a gap of 10 feet between each vehicle. This approach may be particularly effective in visually monitoring and controlling the vehicle flow and is easier to measure and enforce.

With continued reference to FIG. 1, processor 104 may determine a spacing metric 120 using vehicle data 108 associated with two or more vehicles 112. The processor 104 may rely on input from various sensors of the first set of sensors 116 to measure distances or time intervals. For example, in a vehicle spacing scenario, sensors might measure the distance to the vehicle ahead using LIDAR or radar. The raw vehicle data 108 from these sensors may be processed to filter out noise and extract relevant information. Signal processing may involve converting analog signals to digital, normalizing data, or applying algorithms to interpret sensor readings accurately. The processor 104 may account for contextual factors like speed, environmental conditions, or specific operational requirements. The spacing metric 120 between vehicles may be changed according to the vehicles size, service being received.

With continued reference to FIG. 1, processor 104 is configured to generate a collision score 124 as a function of the spacing metric 120 and the plurality of vehicle data 108. As used in the current disclosure, a "collision score" is a quantitative assessment used to evaluate the likelihood of a collision between one or more of the vehicles. This score may be generated by analyzing various aspects of a spacing metric 120 and the movement data associated with each vehicle. A collision score 124 between two or more vehicles may be a metric used to assess and quantify the likelihood, severity, or potential impact of a collision involving those vehicles. The collision score 124 may be a dynamic value that changes in real-time as the components move and interact. A higher score would indicate a greater risk of collision. Collision scores 124 may be generated based on the speed of each vehicle and their spacing metrics 120 are crucial in determining the collision score. Higher relative speeds usually result in higher collision scores due to the increased potential for severe damage. Processor 104 may evaluate the time remaining or the distance before a collision occurs if the vehicles continue their current paths and speeds. Shorter times/distances to collision may result in higher scores. In some embodiments, a collision score 120 may include an indication of severity of the potential accident. Severity can range from virtually no damage (i.e. scratches to the vehicles exterior) up to severe damage to people, property, and other vehicles. When identifying the severity of a potential collision processor 104 may factor in the size and weight of a vehicle along with the previously mentioned factors. Larger and heavier vehicles can may more damage in a collision, so encounters involving such vehicles might have higher collision scores. Collision scores 124 may be updated in real time according to the signals that are received from the sensors, discussed in greater detail herein above. A collision score 124 may be normalized. This may be done to bring all collision scores 124 onto a comparable scale. This step is important to eliminate any bias introduced by different units or measurement scales. Normalization techniques can include min-max scaling, z-score normalization, or logarithmic transformation. In an embodiment, a collision score 124 may be expressed as a numerical score, a linguistic value, or an alphabetical score. A non-limiting example, of a numerical score, may include a scale from 1-10, 1-100, 1-1000, and the like, wherein a rating of 1 may represent an unlikely occurrence of a collision, whereas a rating of 10 may represent an imminent occurrence of a collision. In another non-limiting example, linguistic values may include, "High likelihood of a Collision," "Moderate likelihood of a Collision," "Low likelihood of a Collision," and the like. In some embodiments, linguistic values may correspond to a linguistic variable score range. For example, vehicles that receives a score between 40-60, on a scale from 1-100, may be considered a "Moderate likelihood of a Collision."

With continued reference to FIG. 1, processor 104 may generate a plurality of collision scores 124 using a score machine-learning model 128. As used in the current disclosure, a "score machine-learning model" is a machine-learning model that is configured to generate a collision score 124. Score machine-learning model 128 may be consistent with the machine-learning model described below in FIG. 3. Inputs to the score machine-learning model 128 may include vehicle data 108, dimension data, movement data, spacing metric 120, examples of collision scores 124, and the like. Outputs to the score machine-learning model 128 may include plurality of collision scores 124 tailored to the spacing metric 120 and vehicle data 108. Score training data may include a plurality of data entries containing a plurality of inputs that are correlated to a plurality of outputs for training a processor by a machine-learning process. In an embodiment, score training data may include spacing metrics 120 and vehicle data 108 correlated to examples of collision scores 124. Score training data may be received from database. In an embodiment, score training data may include examples of spacing metrics 120 and vehicle data 108 that have been previously scored. In another embodiment, score training data may contain information about vehicle data 108, dimension data, movement data, spacing metric 120, examples of collision scores 124, and the like. In an embodiment, score training data may be iteratively updated as a function of the input and output results of past score machine-learning model 128 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, machine learning plays a crucial role in enhancing the function of software for generating a score machine-learning model 128. This may include identifying patterns within the spacing metrics 120 and vehicle data 108 that lead to changes in the capabilities and type of the score machine-learning model 128. By analyzing vast amounts of data related to the spacing metrics 120 and vehicle data 108, machine learning algorithms can identify patterns, correlations, and dependencies that contribute to a generating the score machine-learning model 128. These algorithms can extract valuable insights from various sources, including databases, vehicle data 108, current and historical spacing metrics 120, and the like associated with the spacing metrics 120 and vehicle data 108. By applying machine learning techniques, the software can generate a score machine-learning model 128 extremely accurately. Machine learning models may enable the software to learn from past collaborative experiences of the entities and iteratively improve its training data over time.

With continued reference to FIG. 1, processor 104 may be configured to update the training data of the score machine-learning model 128 using user inputs. A score machine-learning model 128 may use user input to update its training data, thereby improving its performance and accuracy. In embodiments, the score machine-learning model 128 may be iteratively updated using input and output results of past iterations of the score machine-learning model 128. The score machine-learning model 128 may then be iteratively retrained using the updated score training data. For instance, and without limitation, score machine-learning model 128 may be trained using first training data from, for example, and without limitation, training data from a user input or database. The score machine-learning model 128 may then be updated by using previous inputs and outputs from the score machine-learning model 128 as second training data to then train a second machine learning model. This process of updating the score machine-learning model 128 and its associated training data may be continuously done to create subsequent score machine-learning models 128 to improve the speed and accuracy of the score machine-learning model 128. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the score machine-learning model 128 or any other machine-learning model/classifier discussed herein.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of classifier. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the output score machine-learning model 128 may be averaged to determine an accuracy score. In some embodiments, an accuracy score may be determined for the scoring of each set of spacing metrics 120 and vehicle data 108. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the score machine learning model.

With continued reference to FIG. 1, processor 104 may be configured to generate a movement metric 132 as a function of the collision score 124 and the spacing metric 120. As used in the current disclosure, a "movement metric" is a quantitative measure to assess and optimize the movement of attachment mechanisms in a system. A movement metric 132 is a sophisticated, data-driven tool used in systems where precise coordination of multiple moving parts, or attachment mechanisms, is critical. It may be designed to optimize the movement patterns of these mechanisms to enhance efficiency and safety, primarily by minimizing the risk of collisions. The metric may be calculated based on two primary factors: the collision score, which quantifies the risk or likelihood of collisions between components, and the spacing metric, which determines the optimal distances between them. A movement metric 132 may be used to quantify vehicle movement influenced by the operation of each attachment mechanism within the system, aiming to minimize collisions. In an embodiment, a movement metric 132 may include data on ideal movement patterns for each attachment mechanism, ensuring that these components work together harmoniously to facilitate safe and efficient vehicle movement. In a non-limiting example, a movement metric 132 may be used to quantify the desired actuation of a plurality of attachment mechanisms in concert with one another. A movement metric 132 may denote that a first attachment mechanism may need to move forward at a first speed, a second attachment mechanism may need to move forward at a second speed, while a third attachment mechanism remains still. The movement metric 132 may dictate how each attachment mechanism should move including direction, speed, and duration to work in harmony with others. This coordination is key to preventing mechanical interference and ensuring smooth operation. For instance, in an automated setting, one part might need to accelerate or decelerate based on the movement of another part to maintain optimal spacing and minimize collision risks. The movement metric may not be static metric because it adapts to changes in the operational environment. This includes variations in speed, different operational modes, or unexpected obstacles. The movement metric responsiveness is crucial in environments where conditions change rapidly or where precision is paramount. In another embodiment, an attachment mechanism 132 may comprise an emergency stop mechanism. As used in the current disclosure, a "emergency stop mechanism" refers to a movement metric 132 that halts the movement of all attachment mechanisms. An emergency stop mechanism may be triggered as a function of the collision score going above a predetermined threshold, wherein a direct signal may be sent by processor 104 for deactivation if the collision score exceeds the predetermined threshold. This may be done with the goal of preventing a collision. In a service environment, the movement metric 132 may ensure that brushes, dryers, and other components move in a synchronized manner relative to each vehicle, adjusting speed and position to avoid contact with the vehicle while ensuring thorough cleaning.

With continued reference to FIG. 1, processor 104 may generate a movement metric 132 using a movement machine-learning model. As used in the current disclosure, a "movement machine-learning model" is a machine-learning model that is configured to generate movement metric 132. movement machine-learning model may be consistent with the machine-learning model described below in FIG. 3. Inputs to the movement machine-learning model may include vehicle data 108, dimension data, movement data, spacing metric 120, collision scores 124, examples of movement metric 132, and the like. Outputs to the movement machine-learning model may include movement metric 132 tailored to the collision score 124. Movement training data may include a plurality of data entries containing a plurality of inputs that are correlated to a plurality of outputs for training a processor by a machine-learning process. In an embodiment, movement training data may include a plurality of collision score 124 correlated to examples of movement metric 132. movement training data may be received from database 400. movement training data may contain information about vehicle data 108, dimension data, movement data, spacing metric 120, collision scores 124, examples of movement metric 132, and the like. In an embodiment, movement training data may be iteratively updated as a function of the input and output results of past movement machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, generating a movement metric 132 may be implemented as a fuzzy inferencing system. As used in the current disclosure, a "fuzzy inference" is a method that interprets the values in the input vector (i.e., collision scores 124 and spacing metric 120.) and, based on a set of rules, assigns values to the output vector. A set of fuzzy rules may include a collection of linguistic variables that describe how the system should make a decision regarding classifying an input or controlling an output. An example of linguistic variables may include variables that represent collision scores 124. Examples of linguistic variables may include terms such as ", "High likelihood of a Collision," "Moderate likelihood of a Collision," "Low likelihood of a Collision," and the like. A collision score 124 and a spacing metric 120 may each individually represent a fuzzy set. The movement metric 132 may be determined by a comparison of the degree of match between a first fuzzy set and a second fuzzy set, and/or single values therein with each other or with either set, which is sufficient for purposes of the matching process.

Still referring to FIG. 1, processor 104 may be configured to display the movement metric 132 using a display device 136. As used in the current disclosure, a "display device" is a device that is used to display a plurality of data and other digital content. A display device 136 may include a user interface. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
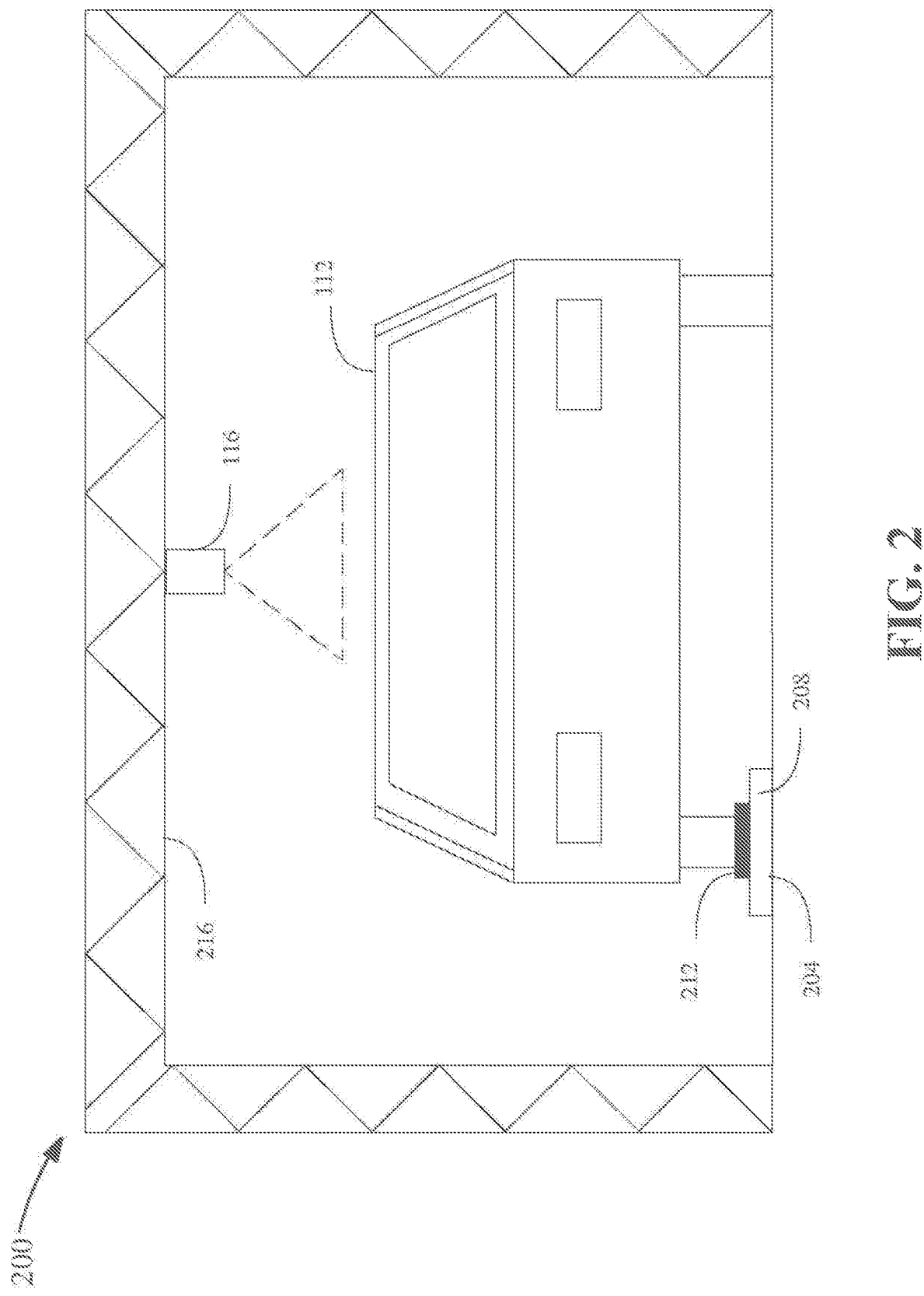
FIG. 2 is an illustration of an exemplary embodiment of a service environment.

Referring now to FIG. 2, an exemplary embodiment of service environment 200. As used in the current disclosure, a "service environment," is a specialized area designed to provide various maintenance and cleaning services for vehicles. Service may include general maintenance, washing, cleaning, body work, manufacturing, and the like. Service environment 200 may be a comprehensive and specialized area dedicated to providing a wide array of maintenance and cleaning services for vehicles. This service environment may cater to various automotive needs, ranging from general maintenance to more specific tasks such as washing, cleaning, body work, and even manufacturing-related services. The layout of service environment 200 may be strategically organized to optimize workflow and efficiency. Service environment 200 may be equipped with advanced diagnostic tools and machinery for routine checks and repairs, such as oil changes, brake services, and engine tune-ups. Service environment 200 may include a washing and cleaning section, where vehicles are treated to a range of cleaning services, from automated car washes to meticulous hand washing and detailing.

With continued reference to FIG. 2, a service environment 200 may include an automated car wash. As used in the current disclosure, an "automated car wash" is a system designed to clean vehicles efficiently and effectively with minimal human intervention. Upon entering the carwash, drivers may encounter a payment station where they can select from various wash options, such as undercarriage cleaning, waxing, or a basic wash. After making their selection and payment, drivers may be guided onto a conveyor system that carefully moves the vehicle through the wash tunnel. Inside this tunnel, the vehicle undergoes a series of cleaning stages, beginning with a pre-soak phase where jets of water and cleaning solutions soften dirt and grime. Following this, rotating brushes and soft cloth strips may gently scrub the vehicle's exterior, while specialized nozzles spray high-pressure water to rinse away loosened debris. Some carwashes also include additional features like wheel cleaning and wax application. The final stage involves powerful air dryers that remove most of the water from the vehicle's surface. This automated process is designed for efficiency, allowing for a thorough cleaning with consistent results in a short amount of time. The convenience and effectiveness of automated carwashes make them a popular choice for vehicle owners looking to maintain their car's appearance with minimal effort.

With continued reference to FIG. 2, service environment 200 may include a conveyor system 204. As used in the current disclosure, a "conveyor system" is a system designed to efficiently and effectively clean vehicles as they move along a set path. Within an automated car wash, the conveyor system 204 may play a crucial role in ensuring a smooth and efficient washing process. Conveyor system 204 may be designed to move vehicles through different cleaning stages without the need for manual driving. The automated car washing process may begin when the vehicle approaches the entrance of the car wash. Here, the driver is usually instructed to align the vehicle with the conveyor track 208. Guidance signs or an attendant might be present to assist with proper positioning. As used in the current disclosure, a "conveyor track" is a track designed to transport items or vehicles from one point to another in a controlled and efficient manner. The conveyor tracks 208 may consist of a long pathway made of durable materials like metal or reinforced rubber. In industrial settings, these tracks can be made of steel or aluminum, while in car washes, they might be made of corrosion-resistant materials to withstand constant exposure to water and cleaning chemicals. For applications like car washes, the track often includes a guidance system that helps align and secure the vehicle onto the track. This system ensures that the vehicle moves smoothly through the wash without veering off course.

With continued reference to FIG. 2, once the vehicle is correctly aligned on the guidance track 208, the conveyor system 204 engages with vehicle using an attachment mechanism 212. As used in the current disclosure, an "attachment mechanism" is a component that connects the conveyor to the items or vehicles it transports. This mechanism ensures that the objects are securely attached to the conveyor system 204, allowing for smooth and controlled movement through the process. The attachment mechanism 212 may be mechanically connected to a conveyor track 208 and a vehicle 112 simultaneously. This may be done by attaching the attachment mechanism 212 to the vehicle via one or more of its wheels or the one or more of its axels. The attachment mechanism 212 may include rollers, hooks, clamps, magnets, wheel engagers, suction cups, and the like. As used in the current disclosure, a "wheel engager" is an attachment mechanism 212 that is configured to be attached to the wheel of vehicle. A wheel engager may include pusher pads, attachment links, rollers, and the like. A wheel engager may be positioned in a recessed area in a conveyor track. In an embodiment, as the vehicle drives over them, the wheel engager may lift the wheels slightly off the track. In some cases, the system may employ an engager-on-demand' approach, where the wheel engager rises to engage the wheel only when a car is present. In a non-limiting example, the wheel engager may make contact either the front wheel or a specific point on the vehicle's undercarriage. With the vehicle in neutral and the braking system disengaged, the conveyor system 204 may gently pull the vehicle forward using the attachment mechanism 212. The speed of the conveyor is precisely controlled to synchronize with the different phases of the washing process and the position of other vehicles. The positioning of the attachment mechanism 212 along the guidance track 208 may be determined by the movement metric 132. The movement metric 132 may denote the movement and position of each attachment mechanism 212 along the guidance track 208. As the vehicle moves along the conveyor, it passes through various cleaning stages. These might include pre-soaking, brushing, high-pressure rinsing, and applying soap or wax. Each stage has equipment positioned to effectively clean the vehicle as it passes by. The conveyor system 204 is designed to accommodate a range of vehicle sizes and shapes, moving them safely through the wash tunnel. Sensors and automatic controls are often used to adjust the conveyor's speed and the spacing between vehicles, preventing collisions and ensuring a smooth flow.

With continued reference to FIG. 2, a conveyor system 204 may include an overhead frame 216. As used in the current disclosure, an "overhead frame" is a structural component that is configured to be mechanically attached to a number of accessories of the conveyor system 204. An overhead frame 216 may be constructed from sturdy materials like steel or aluminum, designed to withstand constant exposure to water, soap, and other cleaning agents. It forms a rigid skeleton over the car wash area, spanning the width and often the length of the wash tunnel. This frame may be used to mount and support various car wash equipment. This includes rotating brushes, high-pressure nozzles, spray arches, drying systems, lighting, a plurality of sensors, mechanical equipment, electrical equipment, and the like. The equipment is strategically positioned on the frame to ensure optimal cleaning and drying of the vehicles as they pass underneath. In an embodiment, an overhead frame may house the necessary plumbing for water delivery and drainage, as well as electrical wiring for powering the wash equipment. These systems may be integrated into the frame to maximize space efficiency and maintain safety.

Referring now to FIG. 3, an illustration of an exemplary embodiment of three-dimensional rendering within a service area. Processor 104 may generate a three-dimensional model 304 associated in the service area. As used in the current disclosure, a "three-dimensional model" is a digital representation that simulates the physical characteristics and spatial dynamics of a vehicle and or service area. The three-dimensional model 304 may go beyond a structural depiction of the service area or vehicle. The model may also integrate dynamic elements such as the movement of vehicles, personnel, equipment, and other obstructions within the space.

With continued reference to FIG. 3. processor 104 may generate a three-dimensional rendering 308 of the vehicles within the service area using the output of the plurality of sensors 116. These sensors may include any sensor mentioned throughout this disclosure, including cameras, motion detectors, GPS trackers, LIDAR sensor, and the like. The three-dimensional model may include one or more three-dimensional renderings 308. As used in the current disclosure, a "three-dimensional rendering" a is rendering of the location of one or more vehicles relative to one another. The rendering may take the form of a geometric prism. This simpler geometric representation might be used for basic visualization or for systems where detailed vehicle models are not necessary. Alternatively, the rendering 308 may take the form of a vehicle as depicted in FIG. 3. These more detailed renderings could closely resemble the actual vehicles, providing a more accurate representation of the vehicle. The three-dimensional rendering 308 may take on the dimensions of the vehicle as denoted by the vehicle data 108 and dimension data, this may include the length, width, and height of the vehicle. The three-dimensional renderings 308 may not be configured to remain in a static location. They may move through the virtual service area or a depiction of the service area in sync with the actual vehicles' movements in the real world as denoted by the movement data of FIG. 1. This synchronization may ensure that the virtual model accurately mirrors the physical environment of the service area at all times. In an embodiment, processor 104 may overlay these three-dimensional renderings 308 onto real-time video footage of the service area. This may mean that as you watch the video of the actual service area, you can also see the 3D renderings moving in tandem with the real vehicles.

With continued reference to FIG. 3, the three-dimensional model may include renderings of the spacing metric 120. These three-dimensional renderings may visualize the spacing metric using colored zones or outlines around the three-dimensional rendering, indicating the minimum safe distance to other objects. These zones could change color based on proximity; for example, turning from green (safe) to red (too close). In another embodiment, the spacing metric may be visualized using numerical indicators. These numerical indicators may be located above or beside each three-dimensional rendering 308. Numerical indicators could display the actual distance to the nearest vehicles, alerting if the distance falls below the optimal spacing metric.

With continued reference to FIG. 3, the three-dimensional model 300 may include renderings of the collision score 124. Each three-dimensional rendering 308 may be color-coded based on its collision score. For instance, a vehicle with a low risk of collision might be colored green, while one with a high risk might be red. This immediate visual representation allows for quick identification of potential hazards. In another embodiment, above or around each vehicle, dynamic icons or alerts could appear when the collision score reaches a certain threshold, signaling an increased risk of collision. These alerts could be in the form of flashing icons, exclamation marks, or other attention-grabbing symbols. In an embodiment, this alert may take the form of one or more vector arrows. The vector arrow may serve as a directional indicator, showing the current movement direction and speed of each vehicle in the service area. These arrows can be superimposed on the 3D model of each vehicle, providing a clear visual representation of their trajectory. In an embodiment, the length and thickness of the vector arrow could vary to represent the vehicle's speed and the urgency of the collision risk. A longer, thicker arrow may indicate higher speed and greater risk. Alongside the vector arrow, additional alert symbols or icons could appear when the collision score reaches a critical level. These could be flashing lights or exclamation points, drawing immediate attention to potential danger.

With continued reference to FIG. 3, processor 104 may generate three-dimensional model 300 by integrating and synchronizes data from the plurality of sensors 116. This may include vehicle data 108, dimension data, movement data, spacing metrics 12, collision scores 124, movement metrics, and the like. In an embodiment, a culmination of all of this data may be represented using a three-dimensional model 300. The processor may use the collected data to construct a 3D spatial model of the service area. This may involve defining the scale, dimensions, and layout of the environment. Additionally, each vehicle may be modeled in 3D. This can range from simple geometric shapes representing the vehicles to more complex models that accurately reflect their physical characteristics. The movement data may be used to animate the vehicles within the 3D environment, reflecting their real-world dynamics and interactions. In order to create the 3D model processor 104 may import a plurality of reference images depicting exemplary service environments and vehicles. These images may be received from the plurality of sensors 116 and/or database 500. From these images processor 104 may be configured to mold three dimensional renderings 308 the vehicles and the service environment. In an embodiment, the actual modeling process may start with the creation of a basic shape, using primitive geometric forms like cubes, spheres, or cylinders as building blocks. This is followed by a detailed sculpting phase, where the modeler manipulates the geometry of the object, refining its shape and adding intricate details. This involves adjusting vertices, edges, and faces of the model, a process that requires a keen eye for detail and a deep understanding of the form and structure of the object being modeled. Processor 104 may be configured to take the molded shapes and place them through a rigging process. A rigging process is a process where a skeleton-like structure is created inside the model. This rigging allows processor 104 to place and animate the model in real time.

With continued reference to FIG. 3, processor 104 may generate three-dimensional model 300 using an animation machine-learning model. As used in the current disclosure, an "animation machine-learning model" is a machine-learning model that is configured to generate three-dimensional renderings 308. animation machine-learning model may be consistent with the machine-learning model described above in FIG. 2. Inputs to the animation machine-learning model may include vehicle data 108, dimension data, movement data, spacing metric 120, collision scores 124, movement metric 132, examples of three-dimensional renderings 308, and the like. Outputs to the animation machine-learning model may include three-dimensional renderings 308 tailored to the vehicle data 108 and movement metric 132. Animation training data may include a plurality of data entries containing a plurality of inputs that are correlated to a plurality of outputs for training a processor by a machine-learning process. In an embodiment, animation training data may include a plurality of vehicle data 108 and movement metric 132 correlated to examples of three-dimensional renderings 308. Animation training data may be received from database 500. Animation training data may include a plurality of photos or videos of vehicles and the service environment. Additionally, animation training data may contain information about vehicle data 108, dimension data, movement data, spacing metric 120, collision scores 124, movement metric 132, examples of three-dimensional renderings 308, and the like. In an embodiment, animation training data may be iteratively updated as a function of the input and output results of past animation machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

Figure 4:
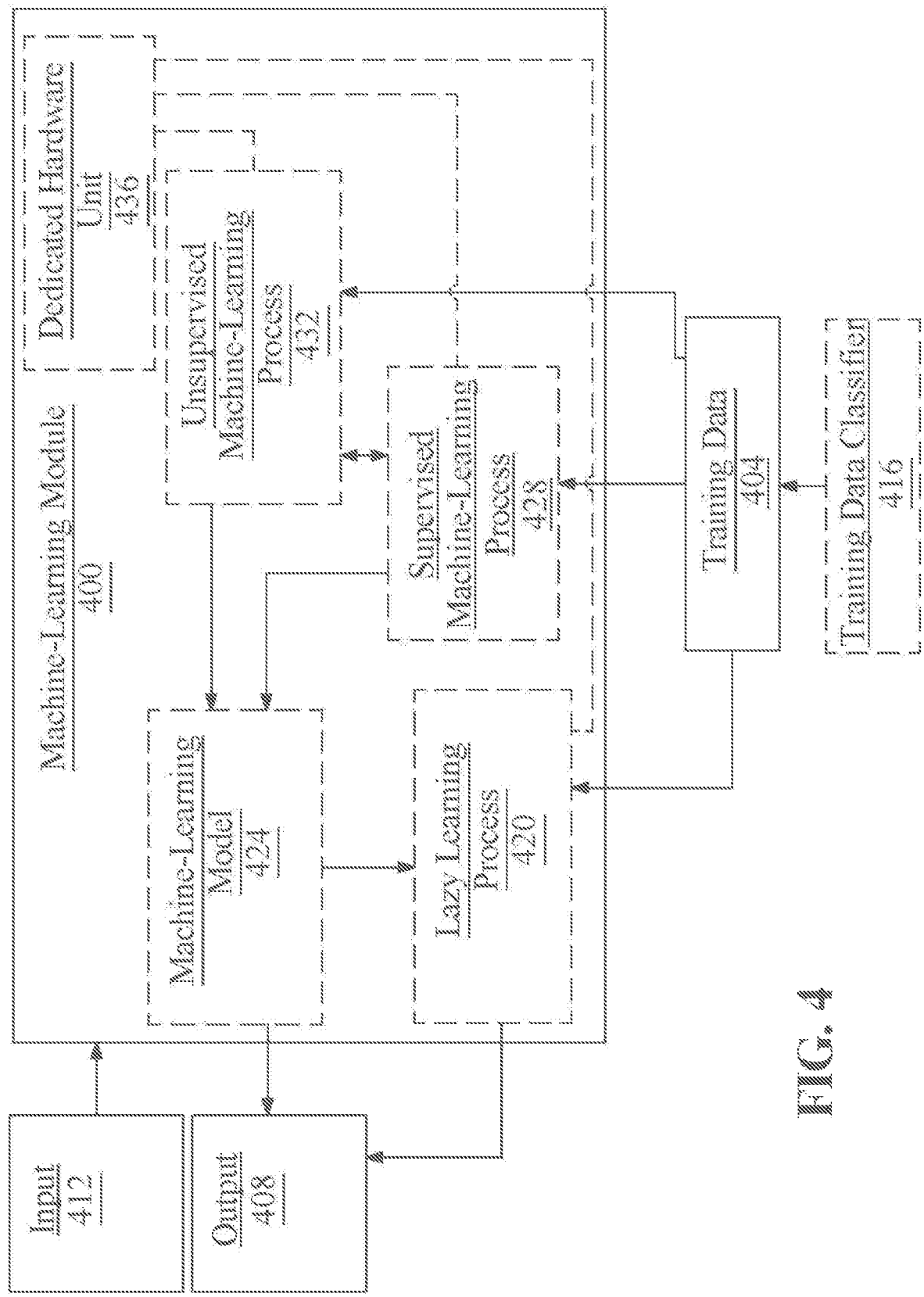
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example spacing metrics 120 and vehicle data 108 as inputs correlated to examples of collision scores 124 as outputs.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to various spacing metrics to specific makes and models of vehicles.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may identify as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to cleanup side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include spacing metrics 120 and vehicle data 108 as described above as inputs, collision scores 124 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
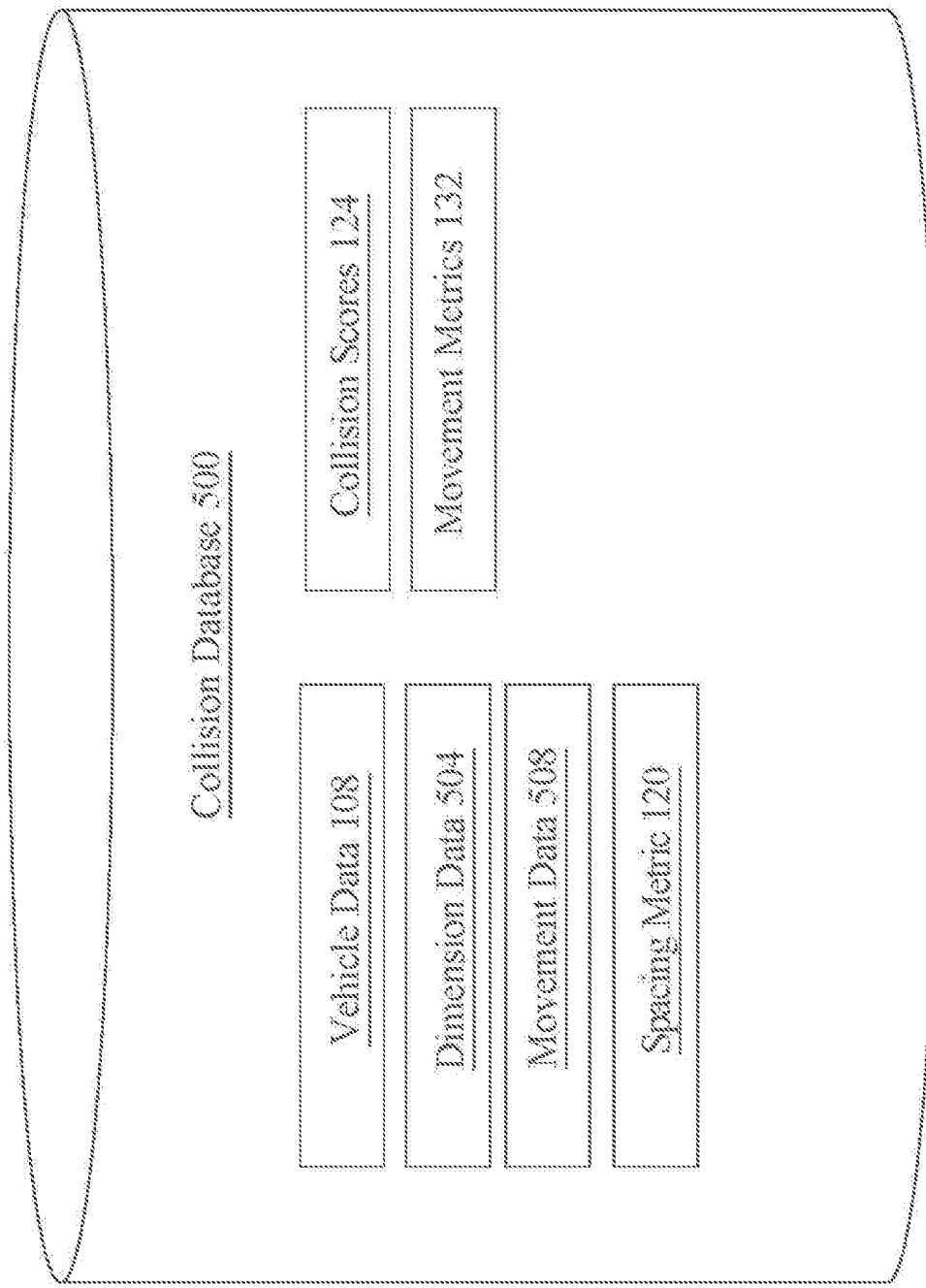
FIG. 5 is a block diagram of an exemplary embodiment of a collision database.

Now referring to FIG. 5, an exemplary collision database 500 is illustrated by way of block diagram. In an embodiment, any past or present versions of any data disclosed herein may be stored within the collision database 500 including but not limited to: vehicle data 108, dimension data 504, movement data 508, spacing metric 120, collision scores 124, movement metrics 132, and the like. Processor 104 may be communicatively connected with collision database 500. For example, in some cases, database 500 may be local to processor 104. Alternatively, or additionally, in some cases, database 500 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Collision database 500 may be implemented, without limitation, as a relational database, a key-value retrieval database such as a NOSQL database, or any other format or structure for use as a database that a person skilled in the art would recognize as suitable upon review of the entirety of this disclosure. Collision database 500 may alternatively or additionally be implemented using a distributed data storage protocol and/or data structure, such as a distributed hash table or the like. Collision database 500 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 6:
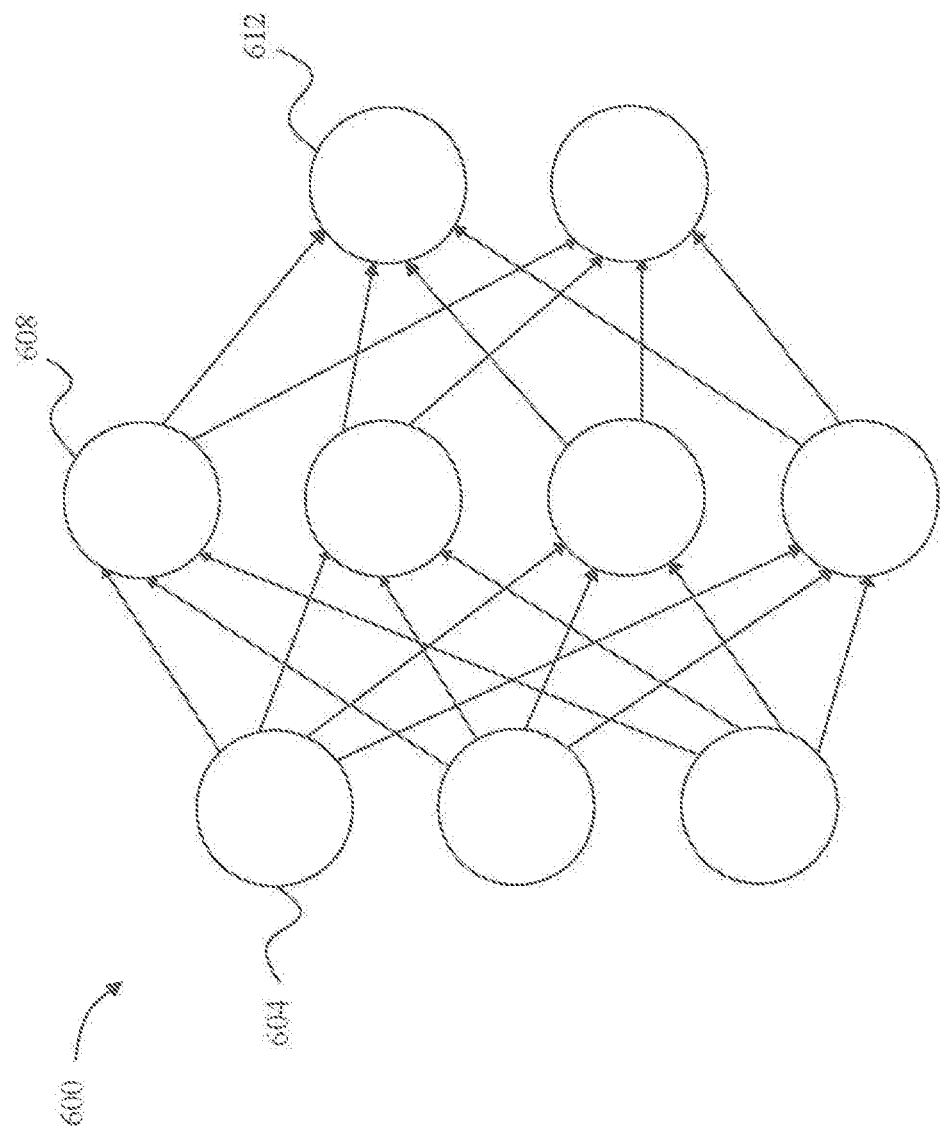
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
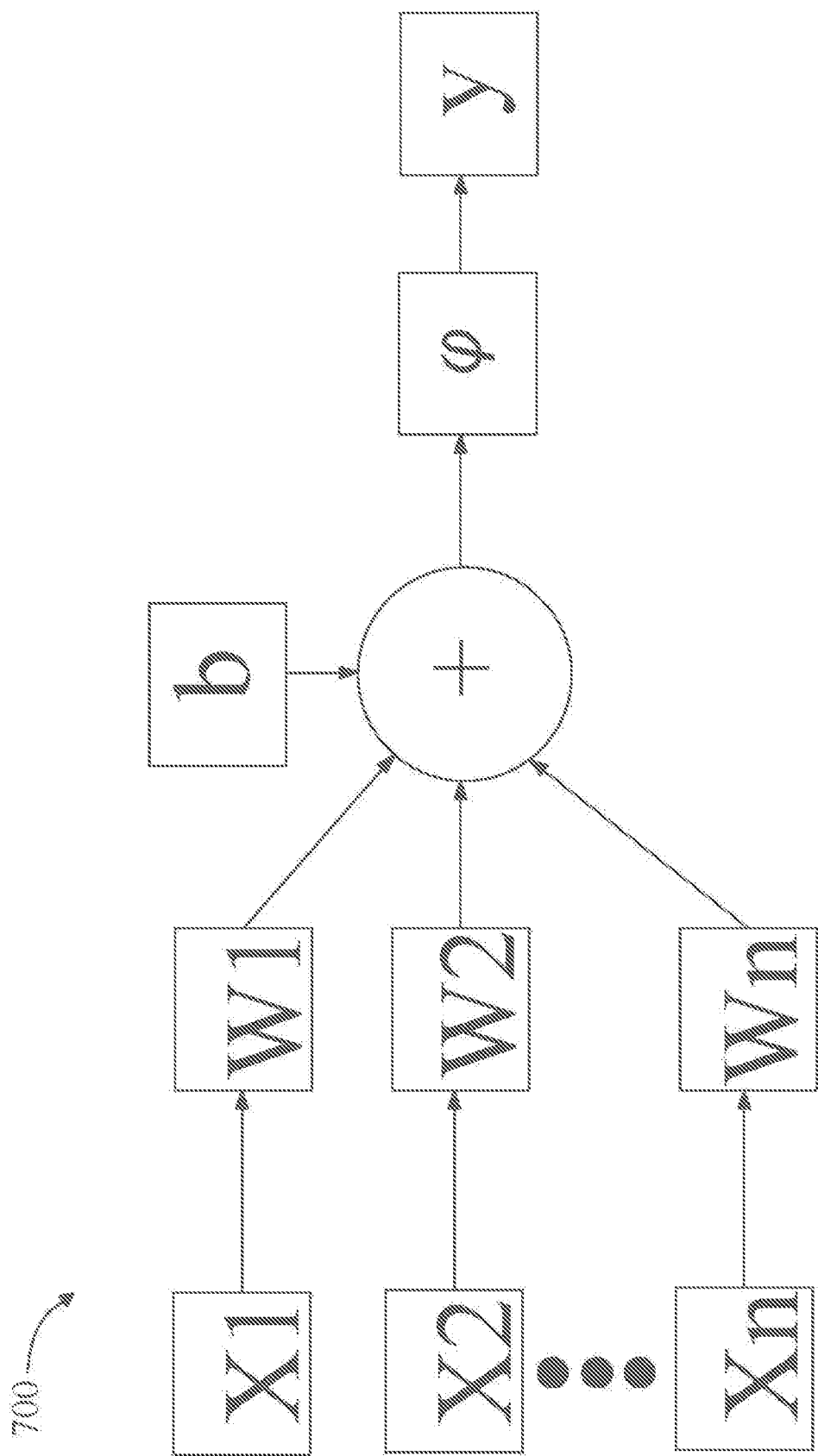
FIG. 7 is a diagram of an exemplary embodiment of a node of a neural network.

Referring now to FIG. 7, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
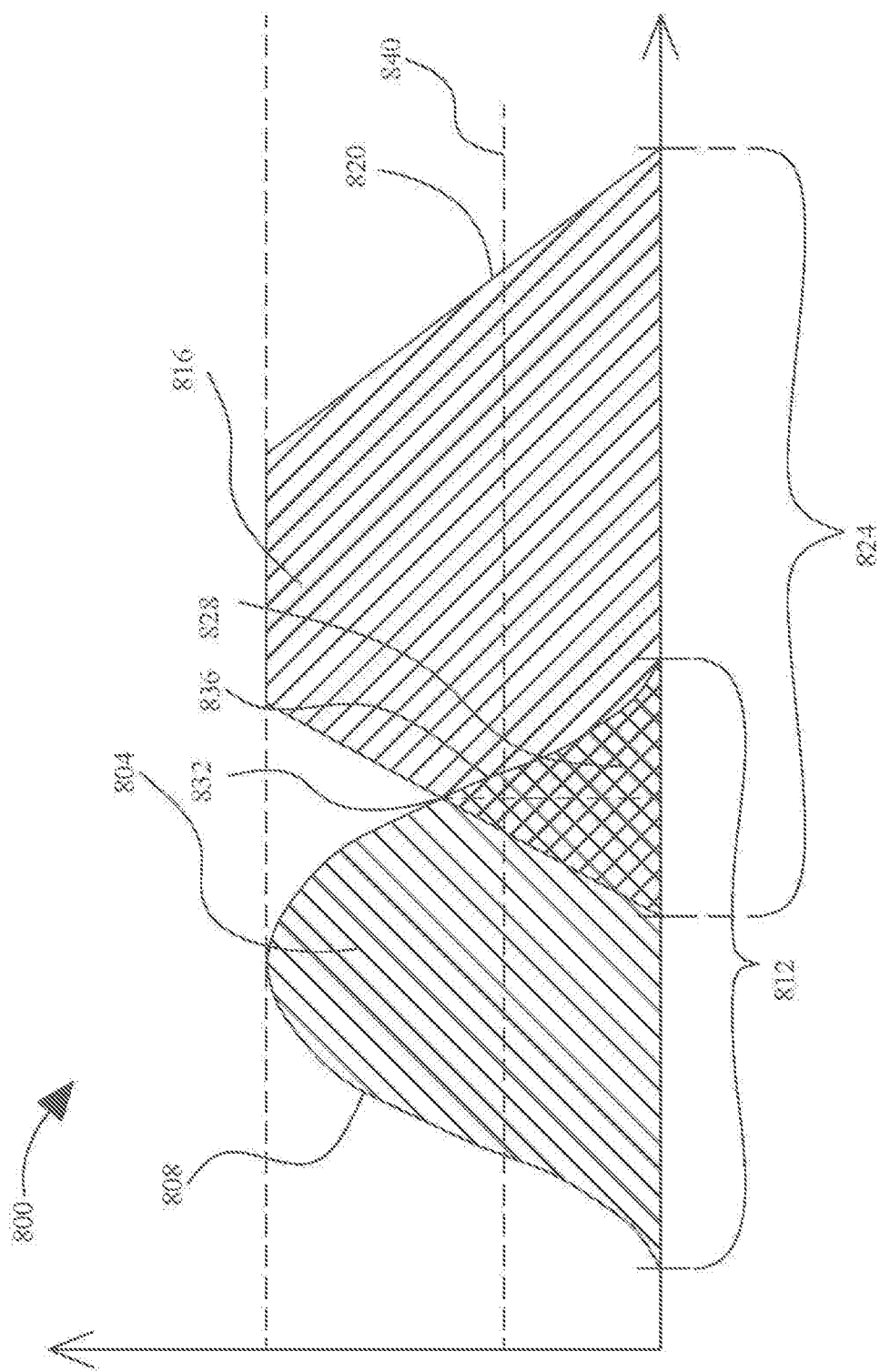
FIG. 8 is an illustration of an exemplary embodiment of fuzzy set comparison.

Now referring to FIG. 8, an exemplary embodiment of fuzzy set comparison 800 is illustrated. In a non-limiting embodiment, the fuzzy set comparison. In a non-limiting embodiment, fuzzy set comparison 800 may be consistent with fuzzy set comparison in FIG. 1. In another non-limiting the fuzzy set comparison 800 may be consistent with the name/version matching as described herein. For example, and without limitation, the parameters, weights, and/or coefficients of the membership functions may be tuned using any machine-learning methods for the name/version matching as described herein. In another non-limiting embodiment, the fuzzy set may represent collision scores 124 and a spacing metric 120 from FIG. 1.

Alternatively, or additionally, and still referring to FIG. 8, fuzzy set comparison 800 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility thresholds using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 8, inference engine may be implemented according to input collision scores 124 and spacing metrics 120. For instance, an acceptance variable may represent a first measurable value pertaining to the classification of collision scores 124 to spacing metric 120. Continuing the example, an output variable may represent a movement metric 132 associated with the user. In an embodiment, collision scores 124 and/or spacing metric 120 may be represented by their own fuzzy set. In other embodiments, the classification of the data into a movement metric 132 may be represented as a function of the intersection two fuzzy sets as shown in FIG. 8, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

A first fuzzy set 804 may be represented, without limitation, according to a first membership function 808 representing a probability that an input falling on a first range of values 812 is a member of the first fuzzy set 804, where the first membership function 808 has values on a range of probabilities such as without limitation the interval [0,1], and an area beneath the first membership function 808 may represent a set of values within first fuzzy set 804. Although first range of values 812 is illustrated for clarity in this exemplary depiction as a range on a single number line or axis, first range of values 812 may be defined on two or more dimensions, representing, for instance, a Cartesian product between a plurality of ranges, curves, axes, spaces, dimensions, or the like. First membership function 808 may include any suitable function mapping first range 812 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 804 may represent any value or combination of values as described above, including any collision scores 124 and spacing metric 120. A second fuzzy set 816, which may represent any value which may be represented by first fuzzy set 804, may be defined by a second membership function 820 on a second range 824; second range 824 may be identical and/or overlap with first range 812 and/or may be combined with first range via Cartesian product or the like to generate a mapping permitting evaluation overlap of first fuzzy set 804 and second fuzzy set 816. Where first fuzzy set 804 and second fuzzy set 816 have a region 836 that overlaps, first membership function 808 and second membership function 820 may intersect at a point 832 representing a probability, as defined on probability interval, of a match between first fuzzy set 804 and second fuzzy set 816. Alternatively, or additionally, a single value of first and/or second fuzzy set may be located at a locus 836 on first range 812 and/or second range 824, where a probability of membership may be taken by evaluation of first membership function 808 and/or second membership function 820 at that range point. A probability at 828 and/or 832 may be compared to a threshold 840 to determine whether a positive match is indicated. Threshold 840 may, in a non-limiting example, represent a degree of match between first fuzzy set 804 and second fuzzy set 816, and/or single values therein with each other or with either set, which is sufficient for purposes of the matching process; for instance, the classification into one or more query categories may indicate a sufficient degree of overlap with fuzzy set representing collision scores 124 and spacing metric 120 for combination to occur as described above. Each threshold may be established by one or more user inputs. Alternatively, or additionally, each threshold may be tuned by a machine-learning and/or statistical process, for instance and without limitation as described in further detail below.

In an embodiment, a degree of match between fuzzy sets may be used to rank one resource against another. For instance, if both collision scores 124 and spacing metric 120 have fuzzy sets, movement metric 132 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 9:
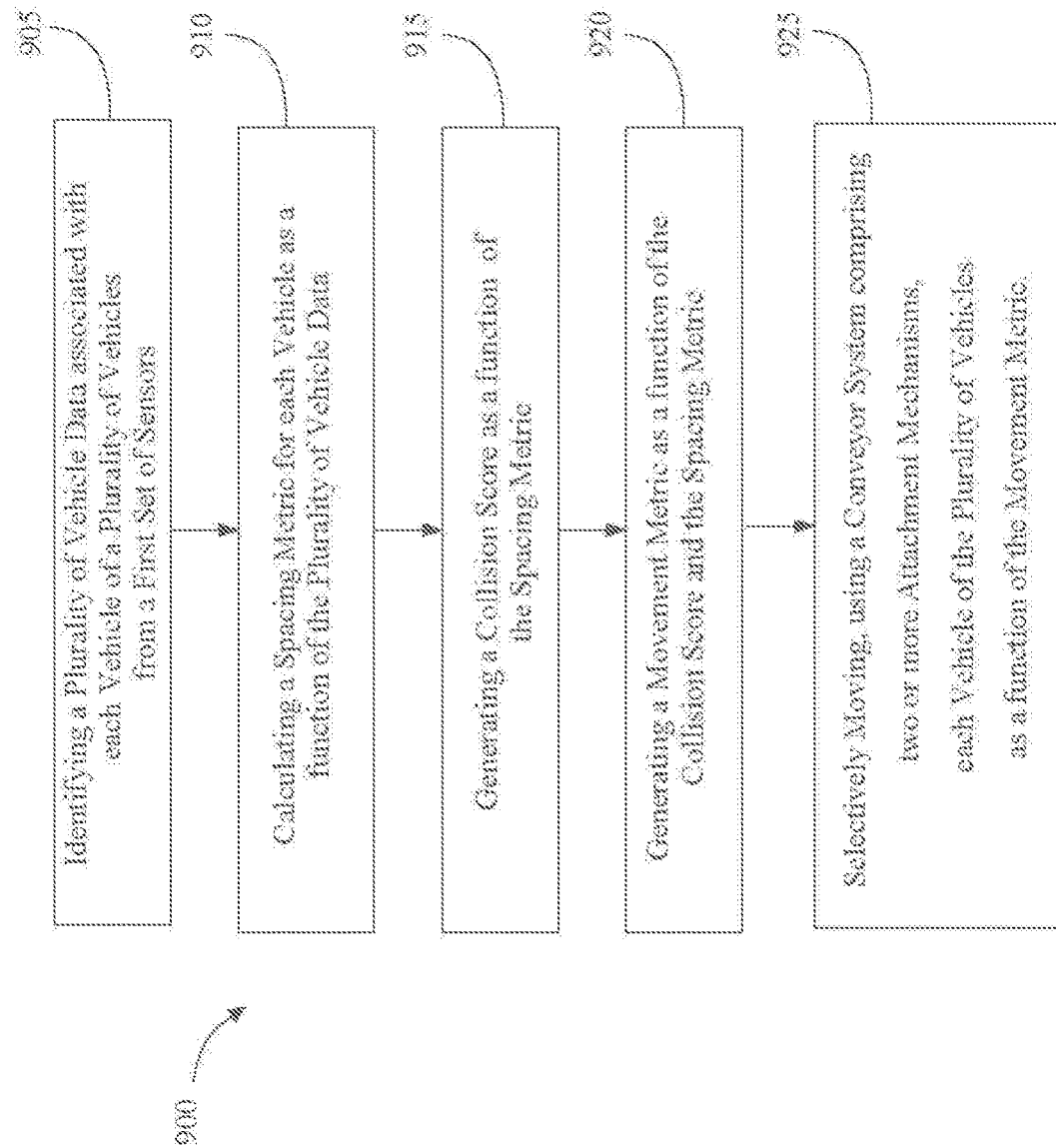
FIG. 9 is a flow diagram of an exemplary method for anti-collision monitoring within a service environment.

Referring now to FIG. 9, a flow diagram of an exemplary method 900 for anti-collision monitoring within a service environment is illustrated. At step 905, method 900 includes identifying, using at least a processor communicatively connected to a conveyor system, a plurality of vehicle data associated with each vehicle of two or more vehicles from a first set of sensors. This may be implemented as described and with reference to FIGS. 1-8. In an embodiment, the plurality of vehicle data may include dimension data and movement data associated with each identified vehicle. In another embodiment, method may include generating, using the at least a processor, an audible collision indicator using at least an audio sensor. In an additional embodiment, the first set of sensors may include at least a LIDAR sensor.

Still referring to FIG. 9, at step 910, method 900 includes calculating, using the at least a processor, a spacing metric for each vehicle as a function of the plurality of vehicle data. This may be implemented as described and with reference to FIGS. 1-8. In an embodiment, the spacing metric may include a temporal metric and/or distance metric associated with the two or more vehicles.

Still referring to FIG. 9, at step 915, method 900 includes generating, using the at least a processor, a collision score as a function of the spacing metric and the plurality of vehicle data. This may be implemented as described and with reference to FIGS. 1-8. In an embodiment, calculating a collision score may include iteratively training a collision machine learning model using collision training data, wherein collision training data comprises a plurality of spacing metrics correlated to examples of collision scores. Calculating a collision score may also include generating a collision score as a function of the spacing metric using a trained collision machine learning model.

Still referring to FIG. 9, at step 920, method 900 includes generating, using the at least a processor, a movement metric as a function of the collision score and the spacing metric. This may be implemented as described and with reference to FIGS. 1-8. In an embodiment, generating the movement metric may include generating an emergency stop mechanism as a function of the audible collision indicator.

Still referring to FIG. 9, at step 925, method 900 includes moving, using the conveyor system comprising one or more attachment mechanisms, each vehicle of the two or more vehicles as a function of the movement metric, wherein the conveyor system is located within a service environment configured. This may be implemented as described and with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
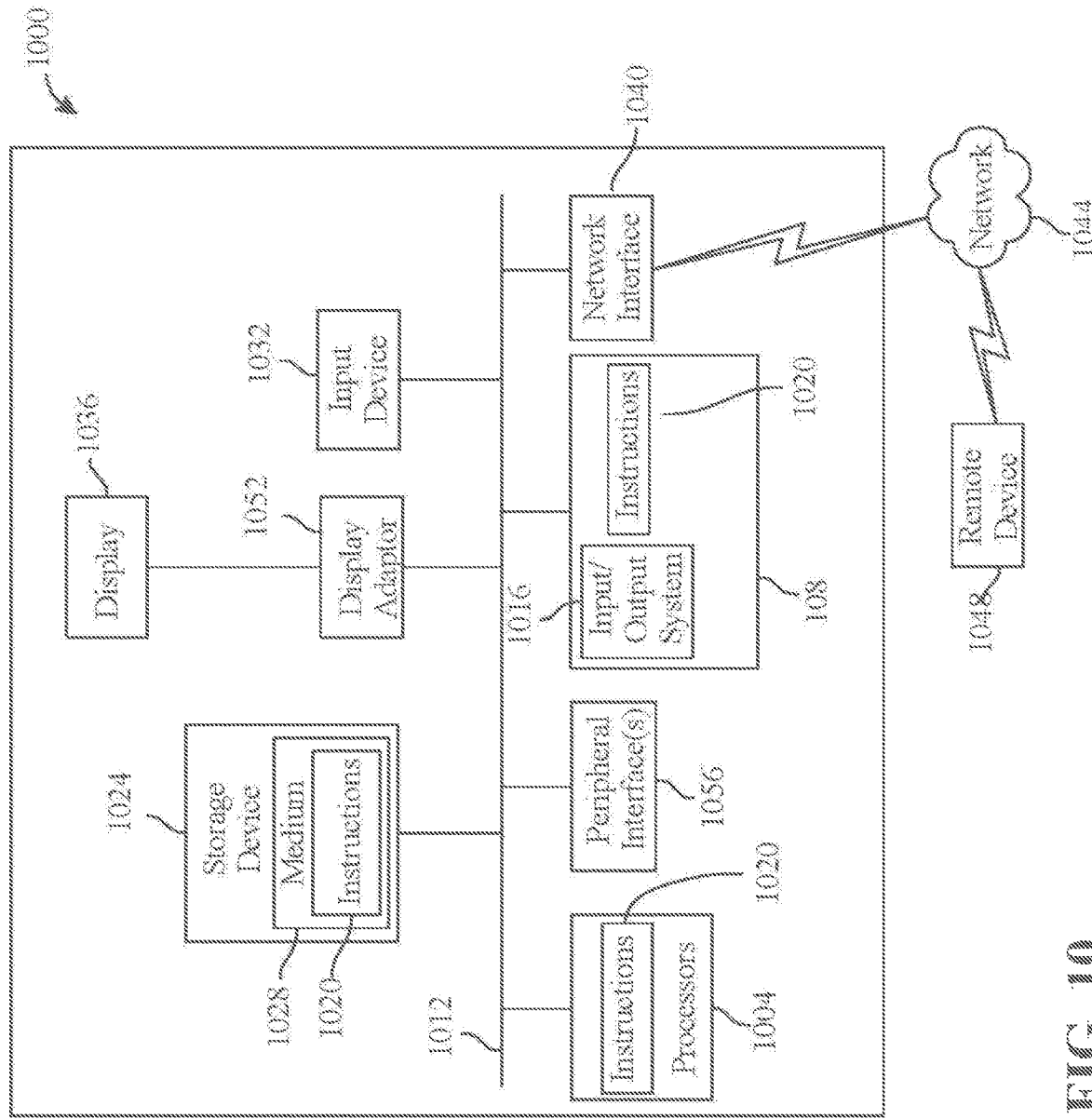
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for anti-collision monitoring within a service environment, wherein the apparatus comprises:
    at least a processor; and
    a memory communicatively connected to the at least a processor and a conveyor system, wherein the memory containing instructions configuring the at least a processor to:
        identify a plurality of vehicle data associated with each vehicle of a plurality of vehicles from a first set of sensors;
        calculate a spacing metric for each vehicle as a function of the plurality of vehicle data;
        generate at least one collision score as a function of the spacing metric and the plurality of vehicle data, wherein the collision score comprises an indication of severity of a potential collision associated with each collision score of the at least one collision score;
        generate a movement metric as a function of the collision score and the spacing metric; and
    a conveyor system located within a service environment, the conveyor system mechanically connected to each vehicle of the plurality of vehicles using one or more attachment mechanisms, wherein the conveyor system is configured to move each vehicle of the plurality of vehicles using the one or more attachment mechanisms as a function of the movement metric.

2. The apparatus of claim 1, wherein the plurality of vehicle data comprises dimension data associated with each identified vehicle.

3. The apparatus of claim 1, wherein the plurality of vehicle data comprises movement data associated with each identified vehicle.

4. The apparatus of claim 1, wherein the memory further instructs the processor to generate a collision indicator using at least an audio sensor.

5. The apparatus of claim 4, wherein generating the movement metric comprises generating an emergency stop mechanism as a function of the audible collision indicator.

6. The apparatus of claim 1, wherein the first set of sensors comprises at least a LIDAR sensor.

7. The apparatus of claim 1, wherein the spacing metric comprises a temporal metric associated with the two or more vehicles.

8. The apparatus of claim 1, wherein the spacing metric comprises a distance metric associated with the two or more vehicles.

9. The apparatus of claim 1, wherein calculating a collision score comprises:
    iteratively training a collision machine learning model using collision training data, wherein collision training data comprises a plurality of spacing metrics correlated to examples of collision scores; and
    generating a collision score as a function of the spacing metric using a trained collision machine learning model.

10. The apparatus of claim 1, wherein the service environment comprises an automated carwash.

11. A method for anti-collision monitoring within a service environment, wherein the method comprises:
    identifying, using at least a processor communicatively connected to a conveyor system, a plurality of vehicle data associated with each vehicle of two or more vehicles from a first set of sensors;
    calculating, using the at least a processor, a spacing metric for each vehicle as a function of the plurality of vehicle data;
    generating, using the at least a processor, at least one collision score as a function of the spacing metric and the plurality of vehicle data, wherein the collision score comprises an indication of severity of a potential collision associated with each collision score of the at least one collision score;
    generating, using the at least a processor, a movement metric as a function of the collision score and the spacing metric; and
    moving, using the conveyor system comprising one or more attachment mechanisms, each vehicle of the plurality of vehicles as a function of the movement metric, wherein the conveyor system is located within a service environment configured.

12. The method of claim 11, wherein the plurality of vehicle data comprises dimension data associated with each identified vehicle.

13. The method of claim 11, wherein the plurality of vehicle data comprises movement data associated with each identified vehicle.

14. The method of claim 11, wherein the method further comprises generating, using the at least a processor, a collision indicator using at least an audio sensor.

15. The method of claim 14, wherein generating the movement metric comprises generating an emergency stop mechanism as a function of the audible collision indicator.

16. The method of claim 11, wherein the first set of sensors comprises at least a LIDAR sensor.

17. The method of claim 11, wherein the spacing metric comprises a temporal metric associated with the two or more vehicles.

18. The method of claim 11, wherein the spacing metric comprises a distance metric associated with the two or more vehicles.

19. The method of claim 11, wherein calculating a collision score comprises:
    iteratively training a collision machine learning model using collision training data, wherein collision training data comprises a plurality of spacing metrics correlated to examples of collision scores; and
    generating a collision score as a function of the spacing metric using a trained collision machine learning model.

20. The method of claim 11, wherein the service environment comprises an automated carwash.

* * * * *